US011695763B2

(12) United States Patent
Chen et al.

(10) Patent No.: US 11,695,763 B2
(45) Date of Patent: Jul. 4, 2023

(54) SYSTEM AND METHOD FOR FINGERPRINTING A DEVICE BASED ON SENSOR DATA

(71) Applicant: PayPal, Inc., San Jose, CA (US)

(72) Inventors: Zhe Chen, Singapore (SG); Hewen Wang, Singapore (SG)

(73) Assignee: PAYPAL, INC., San Jose, CA (US)

( * ) Notice: Subject to any disclaimer, the term of this patent is extended or adjusted under 35 U.S.C. 154(b) by 337 days.

(21) Appl. No.: 17/018,924

(22) Filed: Sep. 11, 2020

(65) Prior Publication Data

US 2022/0086147 A1 Mar. 17, 2022

(51) Int. Cl.
*H04L 9/40* (2022.01)
*G06N 3/08* (2023.01)

(52) U.S. Cl.
CPC .......... *H04L 63/0876* (2013.01); *G06N 3/08* (2013.01)

(58) Field of Classification Search
CPC ... H04L 63/0876; H04L 63/1466; G06N 3/08; G06N 3/0454; H04K 1/00
See application file for complete search history.

(56) References Cited

U.S. PATENT DOCUMENTS

| | | | |
|---|---|---|---|
| 11,200,884 B1 * | 12/2021 | Srinivasan | G10L 17/04 |
| 11,386,887 B1 * | 7/2022 | Teng | G10L 15/22 |
| 2021/0090575 A1 * | 3/2021 | Mahmood | G10L 17/10 |

OTHER PUBLICATIONS

Dey, S., et al., "AccelPrint: Imperfections of Accelerometers Make Smartphones Trackable", Retrieved on Sep. 4, 2020, 16 pages. Retrieved from the internet: http://citeseerx.ist.psu.edu/viewdoc/download?doi=10.1.1.681.1608&rep=rep1&type=pdf.

* cited by examiner

*Primary Examiner* — Khoi V Le
(74) *Attorney, Agent, or Firm* — Haynes and Boone, LLP (57) ABSTRACT

Methods and systems are presented for generating a device fingerprint based on data obtained from one or more sensors on a device. A plurality of data points corresponding to sensor readings are obtained from the one or more sensors on the device. A set of time-domain features and a set of frequency-domain features are extracted from the plurality of data points and inputted to a neural network trained using a triplet network. A device fingerprint that may be used to identify the device is obtained from the neural network.

20 Claims, 7 Drawing Sheets

SYSTEM AND METHOD FOR FINGERPRINTING A DEVICE BASED ON SENSOR DATA

BACKGROUND

The present specification generally relates to computing device security and more particularly to generating a device fingerprint based on readings obtained from one or more sensors on a device.

RELATED ART

An online service provider may wish to uniquely identify computing devices from which it receives requests. When a request is received from a computing device (e.g., when the device visits a web site operated by the service provider), the service provider may attempt to generate a device fingerprint to uniquely identify the device. The device fingerprint may be based on a combination of various characteristics retrievable from the user device by the service provider when the user device accesses a web site from the service provider. For example, the device fingerprint may be based on user agent information transmitted by a web browser when making a request to the service provider, and hardware information (e.g., screen size, aspect ratio, etc.) that may be retrieved or inferred from the device using a client-side scripting language (e.g., JavaScript).

The service provider may use device identification as a tool to protect itself and users from fraud and abuse. For example, the service provider may generate a device fingerprint for a user and associate with the user's account after the user logs into the service provider's web site. On subsequent logins, the service provider may verify the device used to log in matches the device from which the fingerprint was generated, and prompt the user for additional verification information if they do not match (e.g., by performing two-factor authentication). The service provider may also track login attempts by device fingerprint. Excessive log-in attempts to multiple accounts from a single device (identified by the device fingerprint) may be indicative of account takeover attempts. When the service provider detects login attempts to multiple accounts from a single device, it may block or throttle further login attempts from the same device.

Device characteristics used to generate device fingerprints can be spoofed, making it harder to associate a device with a particular fingerprint. For example, an attacker may programmatically modify user-agent information, operating system information, screen-size information, and other information that a device fingerprint may be based on between requests to a service provider. Requests from the same device may then appear as if they are coming from different devices. Thus, there is a need for improved methods of fingerprinting devices that more reliably identifies devices and makes circumvention of the fingerprinting process more difficult.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for generating device fingerprints based on sensor data obtained from a computing device. As discussed above, an online service provider may fingerprint a device based on various device characteristics to uniquely identify the device (e.g., for security and fraud-prevention purposes). To generate a device fingerprint, the service provider may collect and combine data related to various device characteristics. For example, when a user visits a website operated by the service provider, the service provider may receive information about the device's browser and operating system from the user-agent string transmitted by the browser. Using a client-side scripting language, the service provider may also retrieve the device's screen resolution, the time zone and language the device is configured for, and more. The service provider may then combine the information and generate a device fingerprint by feeding the combined information to a fingerprint function (e.g., a hash function).

The more information the service provider is able to extract from a device, the more likely it is a fingerprint generated from that information will reliably identify a single device. Moreover, since device information may be spoofed, and a user may block the service provider from obtaining some of the information sought by the service provider, obtaining additional sources of information from a user device may increase the reliability of a fingerprint by making spoofing more complex and requiring additional effort on the part of users to block the collection of the additional sources of data. Accordingly, embodiments of the present disclosure allow a service provider to collect sensor information from a device and generate a device fingerprint based on the sensor readings, and/or combine data based on the sensor readings with additional device-identifying information. For example, the additional information (e.g., user-agent information, screen size, etc.) may be combined with the sensor data when generating a fingerprint or validating that a fingerprint was generated based on sensor data from a specific device.

Devices such as mobile phones, tablets, and laptop computers may include various sensors to facilitate device operations. For example, a device may include one or more accelerometers and gyroscopes to detect motion for determining a device orientation and providing input to the device (e.g., controlling a game or shaking the device to perform an operation). The device may include an ambient light sensor to adjust the screen brightness or keyboard brightness and a proximity sensor to determine when the device is against a user's face and disable the display. The device may also include a magnetometer for compass functionality. The device may allow the retrieval of certain sensor data by applications running on the device (e.g., by an app developed by the service provider and/or a web browser), and in some instances may request permission from the user before making the sensor data available. For example, in some embodiments, a device may notify the user that a web site accessed through a web browser on the device is requesting accelerometer data and require user approval before transmitting the data, while in other embodiments the device may allow a native application running on the device to collect and transmit sensor data without notifying the user. Variations in sensors from one device to another may allow identification of the device based on readings from the sensors. For example, even if two devices include the same model of accelerometer, variations in the accelerometers may cause subtle differences in the data (also referred to as readings) produced by each accelerometer that allow each device to be identified based on the accelerometer data. As a result, sensor data from a device may be used to generate a device fingerprint that identifies the device.

In some embodiments, a system for generating device fingerprints may obtain sensor data from a first sensor on a first device. The sensor data may include a plurality of data points based on a first set for readings from the first sensor, and each data point may be associated with a timestamp indicating when the reading was taken. For example, the system may receive the sensor data from an application programming interface (API) available to applications running on the device, or from a web browser through a similar API (e.g., the Generic Sensor API). Each data point may correspond to a sensor reading. In some embodiments, a data point may be a tuple including a number of elements. For example, a data point from an accelerometer may be a 3-tuple with values corresponding to acceleration along the x, y, and z axes, and a data point from a gyroscope may be 3-tuple with values corresponding to rotation rates along the x, and, z axes.

The system may then extract a set of time-domain features from the plurality of data points. The root sum square (RSS) of each data point may be computed to form a series of RSSs. For example, for a data point of the form (x, y, z), the RSS is computed as the square root of $x^2+y^2+z^2$. As the sensor readings may not have been collected at equally-spaced times, interpolation (e.g., cubic spline interpolation) may be performed on the data points to obtain a resampled plurality of equally-spaced data points. The time domain features may then be extracted from the resampled plurality of data points. The time domain features may include, for example, a mean, standard deviation, variance, mode, kurtosis, skewness, mean absolute deviation, root-mean-square amplitude, maximum value, minimum value, value range, and/or energy.

The system may also extract a set of frequency-domain features from the plurality of data points. For example, the system may perform a discrete Fourier transform on the resampled plurality of data points to obtain a frequency-domain representation of the resampled plurality of data points, and extract the frequency-domain features from the frequency-domain representation. The frequency-domain features may include, for example, spectral standard deviation, spectral variance, spectral centroid, spectral spread, spectral skewness, spectral kurtosis, spectral crest, irregularity-K, irregularity-J, flatness, and/or spectral entropy.

The system may input the set of time-domain and frequency-domain features into a neural network (e.g., a fully-connected neural network) and obtain a first device fingerprint from an output layer of the neural network. For example, the system may create a vector populated with each of the time-domain and frequency domain features and feed the vector to an input layer of the neural network. The device fingerprint may be, for example, a vector of latent features (also referred to as hidden features) determined algorithmically by the neural network. The system may store the fingerprint in a data store, along with a device ID corresponding to the device, and a pairing ID corresponding to a session (e.g., a web site visit) during which the sensor data on which the fingerprint is based was collected.

In some embodiments, the neural network may be trained using a triplet network. The triplet network may be implemented using three instances (e.g., copies) of the neural network. The system may input an anchor value based on a second set of readings from the first device into the first instance of the neural network, a positive example based on a third set of sensor readings from the first device into the second instance of the neural network, and a negative example based on a set of sensor readings from a different device than the anchor value and the positive example were obtained from. Each instance of the neural network may generate a fingerprint based on the input fed to it, resulting in an anchor fingerprint from the first instance, a positive fingerprint from the second instance, and a negative fingerprint from the third instance.

A triplet loss may then be computed based on the difference between the distance (e.g., the Euclidean distance) between the anchor fingerprint and the positive fingerprint, and the distance between the anchor fingerprint and the negative fingerprint. For example, the triplet loss may be defined by the function $L=\max(d(a, p)-d(a, n)+\text{margin}, 0)$, where a is the anchor fingerprint, p is the positive fingerprint, n is the negative fingerprint, margin is a hyperparameter (e.g., the margin between the positive fingerprint and the negative fingerprint) added to the loss, and d is the Euclidean distance function. The triplet loss function may be used to minimize the distance between the anchor and positive fingerprints and maximize the distance between the anchor and negative fingerprints. In some embodiments, the triplet network may be implemented using only a single instance of the neural network. For example, the anchor value, positive example, and negative example may be fed to the neural network, one at a time, to obtain the anchor fingerprint, positive fingerprint, and negative fingerprint, respectively.

In some embodiments, a device fingerprint may be based on readings from more than one sensor (e.g., from an accelerometer and a gyroscope). For example, the system may obtain a second plurality of data points based on readings from a second sensor on the first device. The system may then perform the same operations as with the first plurality of data points, as described above, to extract a second set of time-domain features and a second set of frequency-domain features based on readings from the second sensor. The second set of time-domain features and the second set of frequency-domain features based on the readings from the second sensor may then be fed as input to the neural network along with the sets of time-domain and frequency-domain features based on the readings from the first sensor. For example, the second set of time-domain features and the second set of frequency-domain features may be added to the vector of features that is inputted to the neural network.

In some embodiments, the system may fuse (e.g., combine) the device fingerprint based on sensor data with additional features. For example, the system may create a vector representing the additional features (e.g., user-agent string, screen size, operating system information, etc.) and concatenate it with the device fingerprint generated from the sensor data. The system may input the concatenated vector into an additional model (e.g., based on a neural network, weighted averaging, and/or Kalman filtering) to obtain a fused fingerprint.

In some embodiments, the system may use the device fingerprint to identify a device. The system may retrieve a plurality of sets of device fingerprints from a data store, where each set of device fingerprints is associated with a device ID. The system may then determine a best-matching set of device fingerprints based on comparisons between the first device fingerprint and each set of device fingerprints. For example, the system may compute the Euclidean distance between the first device fingerprint and fingerprints of the sets of fingerprints and select the set where the average distance between fingerprints in the set and the first device fingerprint is the shortest. Alternately, the system may select the set of fingerprints containing the fingerprint with the shortest distance between it and the first device fingerprint. The system may then determine the device ID associated with the best-matching set of device fingerprints corresponds to the first device. The identification process may be made more efficient by limiting the number of sets of fingerprints from the data store to be compared with the first device fingerprint. For example, each set of device fingerprints may be further associated with at least one additional feature (e.g., a user-agent string obtained from the device for which a set of fingerprints was generated), and the plurality of sets of device fingerprints may be retrieved from the data store based on the at least one additional feature. For example, the system may retrieve only the sets of fingerprints associated with the user-agent string that matches one obtained from the device.

In some embodiments, the system may validate whether the first device fingerprint was generated from a specific device. For example, the device may be associated with a device ID, and the system may retrieve one or more historical device fingerprints based on the device ID from a data store. The system may compare the first device fingerprint to the historical device fingerprints (e.g., based on Euclidean distance). If the minimum (or average) distance between the first device fingerprint and the historical fingerprints is below a threshold, the system may determine the first device fingerprint was generated from the same device as the historical fingerprints. Otherwise, the system may determine the first device is a different device than the device from which the historical fingerprints were generated. In some embodiments, the comparison may also be based on a user-agent string. For example, the data store may include a user-agent string with each set of historical fingerprints, and the first device may be validated as being the device from which the historical fingerprints were generated only if the minimum (or average) distance between the first device fingerprint and the historical fingerprints is below a threshold, and the user-agent string retrieved from the first device matches the one associated with the historical device fingerprints. In some embodiments, the system may reject requests (e.g., login requests or transaction requests) from the first device if it determines the first device fingerprint was not generated from the same device as the historical device fingerprints (e.g., the first device may be misrepresenting its identity).

The system may also validate the identity of the first device by determining, in stages, whether information determined from the device matches information stored (e.g., based on the device ID) in the data store. For example, the system may first determine whether a user-agent string obtained from the device matches one associated with the device ID in the data store. If so, the system may compare screen-size information determined from the device to determine if it matches screen-size information stored in the data store, and then compare the device fingerprint obtained from the device to device fingerprints stored in the data store. If all or some of the information matches, the device may be determined to be the one identified by the device ID in the data store. In some embodiments, the comparisons may be done in parallel rather than sequentially.

Figure 1:
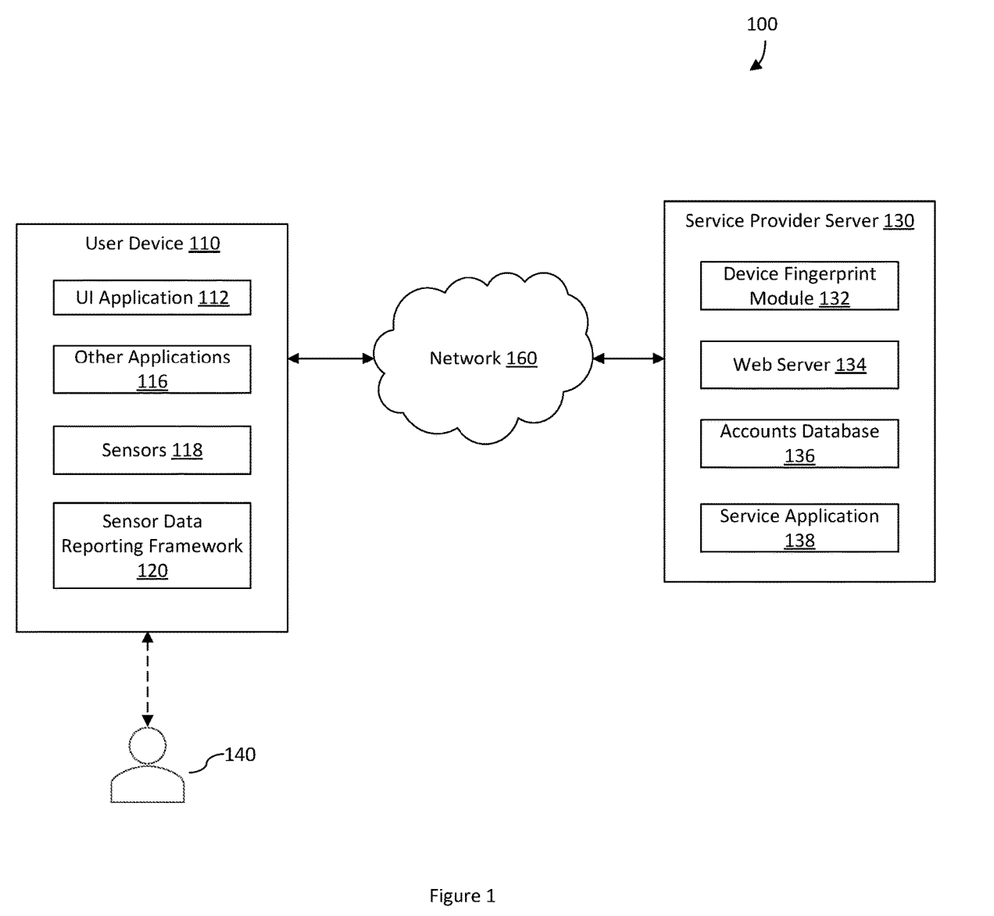
FIG. 1 is a block diagram illustrating a system for generating a device fingerprint, according to an embodiment of the present disclosure.

FIG. 1 illustrates a system 100 for generating a device fingerprint based on sensor data, according to an embodiment of the present disclosure. The system 100 includes a service provider server 130 associated with a service provider, and a user device 110, which may communicate via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the service provider server 130 over the network 160. For example, the user 140 may use the user device 110 to log in to a user account with the service provider to access account services or conduct electronic transactions (e.g., account transfers or payments, purchase goods and/or services, sales of goods and/or services, receive payments of the sale, etc.) with the service provider server 130. The user 140 may also use the user device to request services offered by the service provider server (e.g., credit cards, loans, etc.). The user 140 represented here may be a natural person, a group of people, a community, and/or a business entity. Examples of business entities include merchant sites, resource information sites, utility sites, real estate management sites, social networking sites, etc., which offer various items for purchase and process payments for the purchases.

The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser), which may be utilized by the user 140 to conduct electronic transactions (e.g., selling, shopping, purchasing, bidding, etc.) with the service provider server 130 or request services (e.g. credit cards, loans, etc.) from the service provider server 130 over the network 160. In one implementation, the user interface application 112 includes a software program, such as a graphical user interface (GUI), executable by a processor that is configured to interface and communicate with the service provider server 130 via the network 160. In another implementation, the user interface application 112 includes a browser module that provides a network interface to browse information available over the network 160. For example, the user interface application 112 may be implemented, in part, as a web browser to view information available over the network 160.

The user device 110, in various embodiments, may include other applications 116 as may be desired in one or more embodiments of the present disclosure to provide additional features available to the user 140. For example, the applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in various embodiments, may include one or more sensors 118. The sensors 118 may include, for example, accelerometers, gyroscopes, magnetometers, proximity sensors, and/or light sensors. The sensors 118 may include more than one of a sensor type (e.g., the sensors 118 may include two accelerometers). The sensors 118 may periodically gather and report sensor data (e.g., data related to device position and orientation) to, for example, a sensor data reporting framework 120.

The user device 110, in various embodiments, may include a sensor data reporting framework 120. The framework 120 may collect and process data from the sensors 118 and provide the data to the UI application 112. For example, the framework 120 may include an API for subscribing to sensor events and the UI application 112 may subscribe to sensor events or request the most recent sensor event for any of the various sensors. The UI application 112 may provide the sensor data to the service provider server 130 on request (e.g., through a JavaScript API).

In various implementations, the user 140 is able to input data and information into an input component (e.g., a keyboard or touch screen) of the user device 110 to provide user information with a transaction request, such as a login request, a fund transfer request, a request for adding an additional funding source (e.g., a new credit card), or other types of request. The user information may include user identification information.

Even though only one user device 110 is shown in FIG. 1, it has been contemplated that one or more user devices (each similar to user device 110) may communicate with other components via the network 160 within the system 100.

The service provider server 130, in one embodiment, may be maintained by an online service provider, which may provide services (e.g., selling of merchandise processing, performing electronic transactions, banking services, etc.). As such, the service provider server 130 may include a service application 138, which may be adapted to interact with the user devices (such as the user device 110) over the network 160 to facilitate the searching, selection, purchase, payment of items, and/or other services offered by the service provider server 130. In one example, the service provider server 130 may be provided by PayPal®, Inc., of San Jose, Calif., USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include a web server 134 that is configured to serve web content to users in response to HTTP requests. As such, the web server 134 may include pre-generated web content ready to be served to users. For example, the web server 134 may store a log-in page, and may be configured to serve the log-in page to users for logging into user accounts of the users to access various service provided by the service provider server 130. The web server 134 may also include other webpages associated with the different services offered by the service provider server 130. As a result, a user (e.g., the user 140) may access a user account associated with the user and access various services offered by the service provider server 130, by generating HTTP requests directed at the service provider server 130.

The service provider server 130, in one embodiment, may be configured to maintain one or more user accounts (e.g., a buyer account, a seller account, etc.) in an accounts database 136, each of which may include account information associated with one or more users (e.g., the user 140 associated with user device 110). For example, account information may include private financial information of users and merchants, such as one or more account numbers, passwords, credit card information, banking information, digital wallets used, transaction history, or other types of financial information. In certain embodiments, account information also includes user purchase profile information such as account funding options and payment options associated with the user, payment information, receipts, and other information collected in response to completed funding and/or payment transactions.

In one implementation, a user may have identity attributes stored with the service provider server 130 (e.g., in the accounts database 136), and the user may have credentials to authenticate or verify identity with the service provider server 130. Credentials may include an e-mail address or username, and a password. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130.

The service provider server 130 may also include a device fingerprint module 132. The device fingerprint module may collect data from a user device 110 (e.g., from request headers transmitted by the UI application 112, or through various APIs) and generate one or more fingerprints based on the collected data. The data may include readings from various sensors 118, information obtained from a user-agent string (e.g., web browser and operating system information), and/or information requested from the device or inferred from the device (e.g., through JavaScript calls and web browser behavior).

Figure 2:
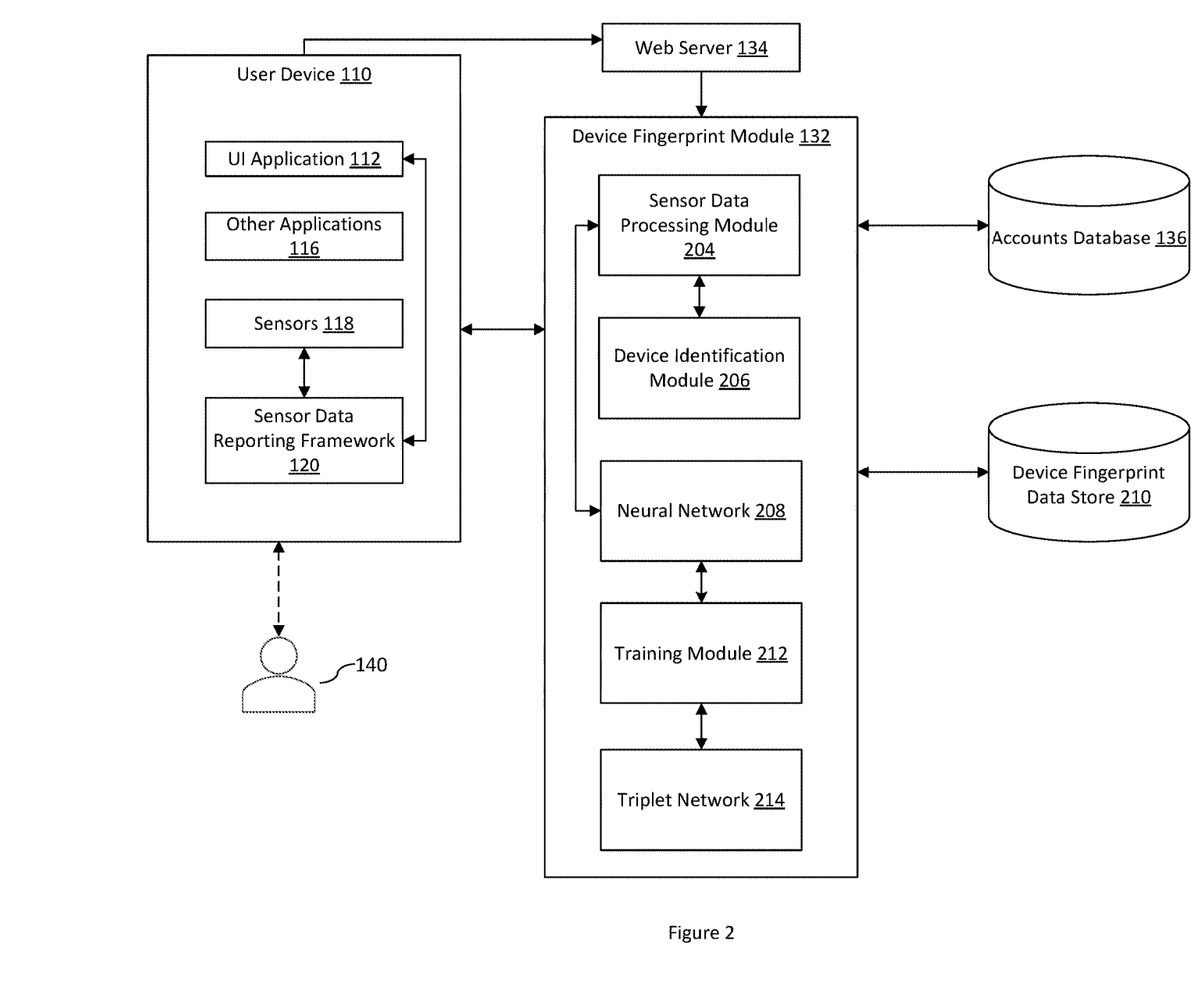
FIG. 2 is a block diagram illustrating a device fingerprint module according to an embodiment of the present disclosure.

FIG. 2 illustrates a block diagram, in more detail, of the system 100 interacting with the device fingerprint module 132 according to an embodiment of the disclosure. The device fingerprint module 132 includes a sensor data processing module 204, a data identification module 206, a neural network 208, a training module 212, and a triplet network 214 for use in training the neural network 208. The device fingerprint module 132 may communicate with an accounts database 136 to retrieve and store user account information and with a device fingerprint data store 210.

The device fingerprint data store 210 may store device fingerprints and associated data, as well data for training the neural network 208. The device fingerprint data store 210 may include records associating one or more device fingerprints with a device ID, so that a set of fingerprints may be retrieved based on a device ID. Device fingerprints may also be associated with a pairing ID, corresponding to a session (e.g., interactions with a web site hosted by the service provider) during which sensor data used to generate the device fingerprints was retrieved from the user device 110. For example, a user device 110 may be associated with a unique device ID, each device ID may be associated with multiple pairing IDs (since a user device 110 may participate in multiple sessions), and each pairing ID may be associated a device fingerprint generated using sensor data obtained during a single session. In some embodiments, a device ID corresponding to the user device 110 may also be stored in the accounts database 136 in association with the user account that was accessed using the user device 110. Multiple device IDs may be associated with a single account (e.g., when a user 140 uses multiple devices 110 to access an account), and multiple accounts may be associated with a single device ID (e.g., when a user device 110 is shared among multiple users 140). In some embodiments, device fingerprints may also be stored in the accounts database 136 in association with the user account that participated in a session during which the sensor data for the device fingerprint was collected.

The sensor data processing module 204 may collect and process sensor data from the user device 110. When a user device 110 makes a request to the web server 134 or otherwise interacts with the service provider server 130, the sensor data processing module 204 may request sensor data from the user device 110. For example, the user device may access a web site hosted by the web server 134 through a web browser (e.g., the UI application 112). The sensor data processing module 204 may interact with the web server 134 to collect sensor data using a scripting language (e.g., JavaScript). The sensor data may include multiple data points from multiple readings from one or more sensors 118 on the user device 110. A data point may be a tuple including a number of elements. For example, a data point from an accelerometer may be a 3-tuple with values corresponding to acceleration along the x, y, and z axes, and a data point from a gyroscope may be 3-tuple with values corresponding to rotation rates along the x, y, and, z axes. The sensor data processing module 204 may extract a number of time-domain and frequency-domain features from the data points and feed them to the neural network 208 to obtain a device fingerprint, as described in herein and FIGS. 3 and 5. The device fingerprint may subsequently be stored in the device fingerprint data store 210 and/or the accounts database 136.

The device identification module 206 may identify a user device 110 based on a device fingerprint. For example, the device identification module 206 may communicate with the sensor data processing module 204 to generate a current device fingerprint based on sensor data obtained by the web server 134 during a request from the user device 110. The device identification module 206 may then search the device fingerprint data store 210 for a set of one or more fingerprint that matches the current device fingerprint. Two fingerprints may be considered to match if the distance (e.g., the Euclidean distance) between them is at or below a threshold. The threshold may vary based on how important it is for the system to ensure the two fingerprints come from the same device, such as transactions or requests for data that are higher in value (e.g., dollar amount, type of information, such as personal identification information (PII) or funding source information like account numbers or credit card numbers, and the like. The device identification module 206 may compute the average distance between fingerprints in each set to the current fingerprint and choose the set with the shortest average distance, or it may select the set containing the device fingerprint with the shortest distance from the current device fingerprint. The device identification module 206 may then identify the user device 110 by retrieving the device ID associated with the selected set of device fingerprints. The device identification module 206 may narrow the sets of device fingerprints considered based on other data obtained from the user device (e.g., by the web server 134). For example, the device identification module 206 may consider only sets of fingerprints associated with specific characteristics (e.g., having the same user-agent string, operating system type and/or version, and/or screen size) as the device 110.

The device identification module 206 may also validate that a user device 110 corresponds to a device ID based on the current device fingerprint. For example, device identification module 206 may retrieve a set of device fingerprints associated with the same device ID as user device 110 and determine if the current fingerprint matches fingerprints in the set. If not, the device identification module 204 may determine the user device 110 is not the same device from which the set of fingerprints associated with the device ID of user device 110 was generated, possibly indicating the user device 110 is misrepresenting itself to the service provider server 130 (e.g., by spoofing the device ID, or characteristics used to determine the device ID). The service provider server 130 may then act to defend against potential harm from the user device 110 (e.g., by blocking requests from the device).

The neural network 208 may be configured to generate device fingerprints based on sensor data retrieved from the sensors 118. The neural network 208 may receive sets of time-domain and frequency-domain features extracted from the sensor data by the sensor data processing module 204, and generate a device fingerprint based on sets of features, as described in detail above and in FIGS. 3 and 5. The neural network 208 may be trained by the training module 212 using the triplet network 214 as described in detail above and in FIG. 4. The triplet network 214 may be comprised of three instances of the neural network 208. In some embodiments, the neural network 214 may alternately be implemented using the single neural network 208, and operations involving more than one instance may be performed by invoking the neural network 208 multiple times (e.g., three times) using data intended for each instance. For example, the training module 212 may train the neural network 208 by inputting a series of triplets into the triplet network 214, each triplet including an anchor value and a positive example from the same device, and a negative example from a different device. The anchor value, positive example, and negative example may each include time-domain and frequency-domain features extracted from sensor data. The triplet network 214 may be used to compute a triplet loss (e.g., using a Euclidean distance function) based on the input and minimize the distance between the fingerprint generated from the anchor value and the fingerprint generated from the positive example, while maximizing the distance between the fingerprint generated from the anchor value and the fingerprint generated from the negative example.

Figure 3:
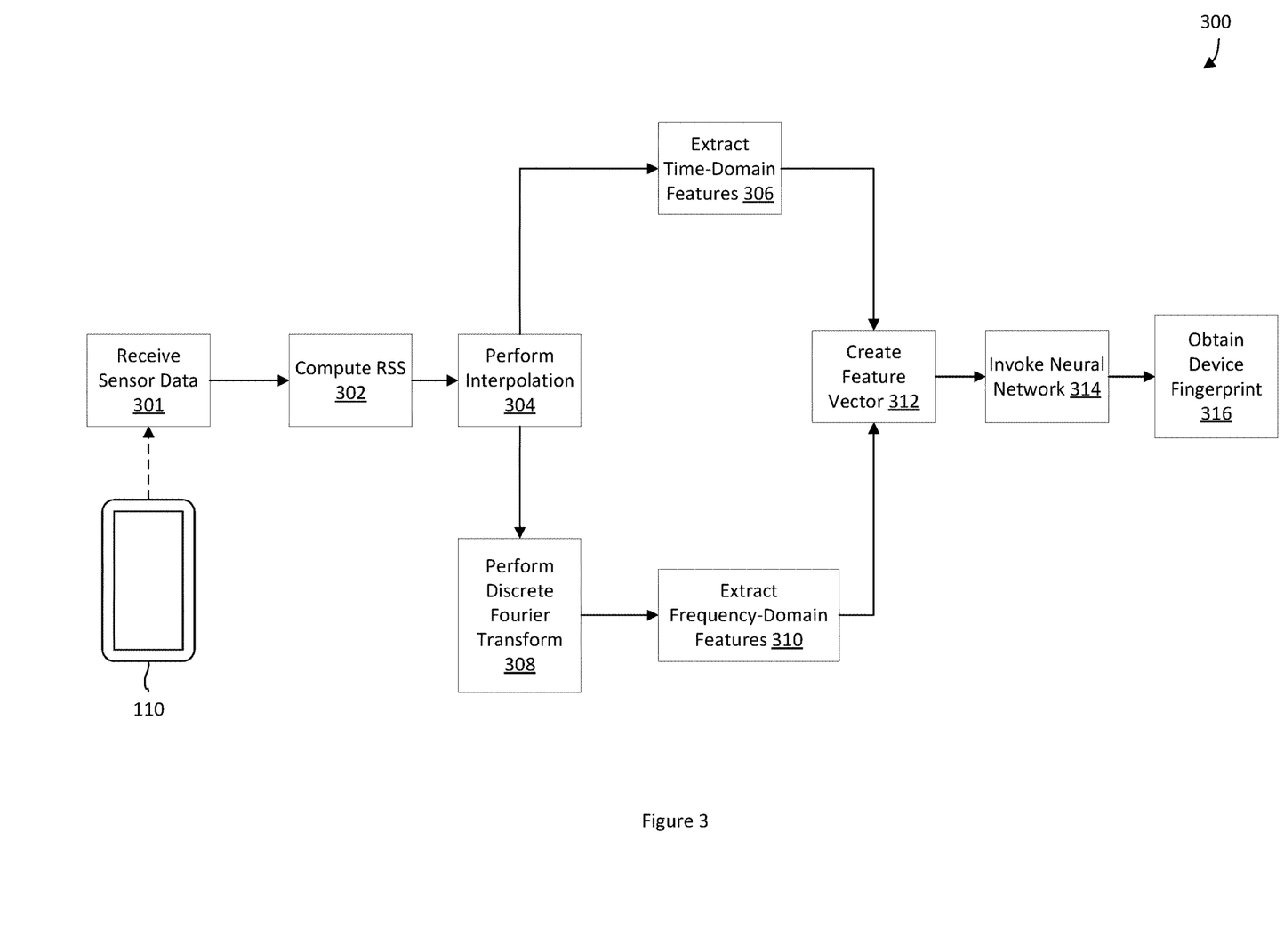
FIG. 3 illustrates a process by which an exemplary device fingerprint may be generated according to various embodiments of the present disclosure.
Figure 4:
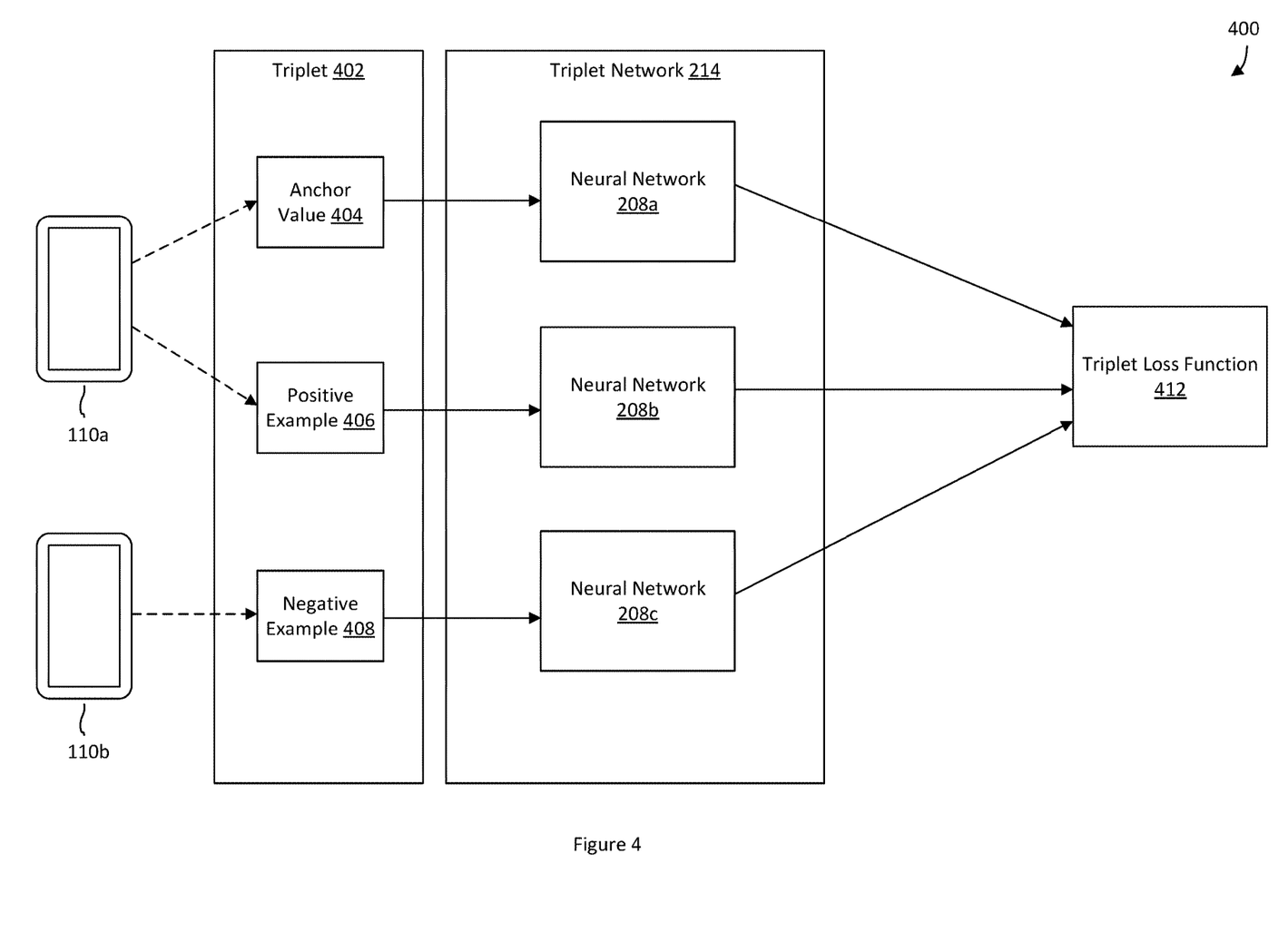
FIG. 4 illustrates a triplet network for training a neural network configured to generate device fingerprints according to various embodiments of the present disclosure.
Figure 5:
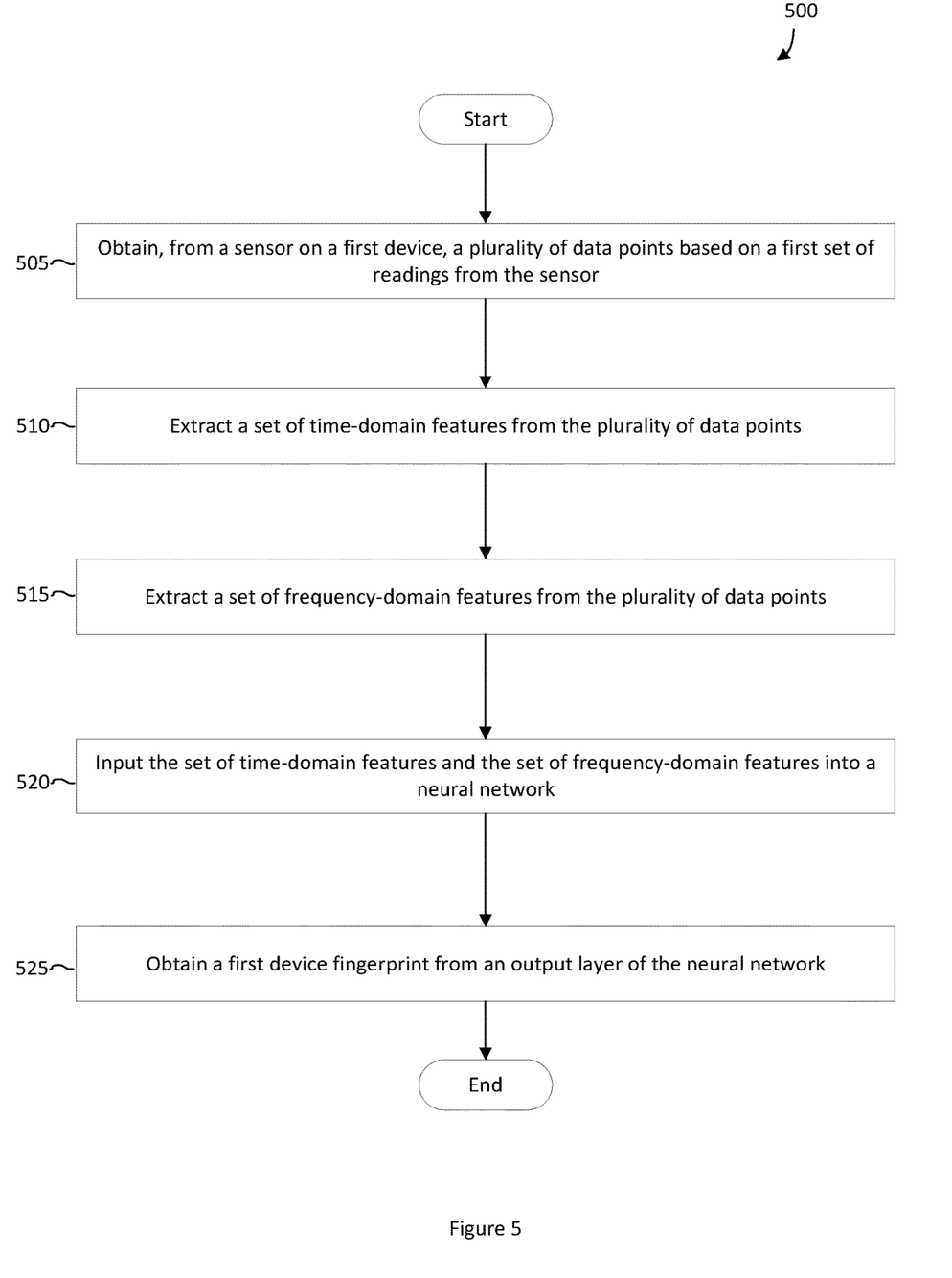
FIG. 5 is a flowchart illustrating a process for generating device fingerprints according to an embodiment of the present disclosure.

FIG. 3 illustrates a process 300 by which an exemplary device fingerprint may be generated (e.g., by a sensor data processing module 204 of a device fingerprint module 132) according to various embodiments of the present disclosure. The process 300 describes generating a fingerprint based on data from an accelerometer on user device 110, but any combination of data from sensors 118 may be used to generate the fingerprint. Note that the steps described below with respect to FIGS. 3-5 are also described above and can be performed in a different order, combined, or omitted as appropriate in different embodiments.

At step 310, the sensor data processing module 204 may receive data from an accelerometer on the user device 110 after the user device visits a web site hosted by a service provider on a web server 134. For example, web server 134 may use a scripting language (e.g., JavaScript) to subscribe to events generated by the accelerometer on device 110. When a user 140 moves the device, the accelerometer may generate an event and notify the web server 134 of the event. The event may include a data point or a tuple of the form (x, y, z), with x representing acceleration along the x-axis, y representing acceleration along the y axis, and z representing acceleration along the z-axis. The web server 134 may collect multiple data points and invoke the device fingerprint module 132 to generate a device fingerprint based on the data points.

At step 302, the sensor data processing module 204 may compute the RSS of each data point received at step 301, translating each tuple of the form (x, y, z) into a single floating-point value, resulting in a series of floating-point values. Because events from the accelerometer may not be generated at a uniform time interval (e.g., they may be generated when the user device 110 is moved), it may be helpful to resample to the data points to obtain data points evenly spaced in time.

At step 304 the sensor data processing module 204 may perform interpolation on the series of data points to obtain evenly-spaced data points for further processing. For example, the sensor data processing module 204 may use cubic spline interpolation to create additional data points for the series, resulting a series of data points evenly spaced in time.

At step 306, the sensor data processing module 204 may extract various time-domain features from the interpolated series of data points. The time domain features may include, for example, a mean, standard deviation, variance, mode, kurtosis, skewness, mean absolute deviation, root-mean-square amplitude, maximum value, minimum value, value range, and/or energy.

At step 308, the sensor data processing module 204 may convert the interpolated series of data points into a frequency-domain representation. The sensor data processing module 204 may perform a discrete Fourier transform on the interpolated series of data points to obtain the frequency-domain representation.

At step 310, the sensor data processing module 204 may extract various frequency-domain features from the frequency-domain representation. The frequency-domain features may include, for example, spectral standard deviation, spectral variance, spectral centroid, spectral spread, spectral skewness, spectral kurtosis, spectral crest, irregularity-K, irregularity-J, flatness, and/or spectral entropy.

At step 312, the sensor data processing module 204 may combine the time-domain and frequency-domain features extracted from the accelerometer data points into a vector. For example, the vector may include an element for every time-domain feature and an element for every frequency-domain feature.

At step 314, the sensor data processing module 204 may feed the vector of features as input to the neural network 208, and at step 316, the sensor data processing module 204 may receive a device fingerprint as output from the neural network 208. The device fingerprint may be a vector of floating point values corresponding to latent features (e.g., hidden features generated by the neural network 208 based on the vector of features fed as input).

FIG. 4 is a block diagram 400 that illustrates a triplet network 214 for training a neural network 208 configured to generate device fingerprints according to various embodiments of the present disclosure. The training operations described may be performed, for example, by a training module 212 of a device fingerprint module 132.

The training module may create a triplet 402 comprised of an anchor value 404, a positive example 406, and a negative example 408. The anchor value 404 and the positive example 406 may both be based on data obtained from the same user device 110a, while the negative example 408 may be based on sensor data obtained from a different user device 110b. The anchor value, positive example, and negative example may each be a vector of time-domain features and frequency-domain features extracted from sensor data obtained from their respective devices. For example, the vectors may be obtained by following steps 301-312 of the process 300 as illustrated in FIG. 3 and described above.

The triplet 402 may be fed as input to the triplet network 214. The triplet network 214 may include three instances of the neural network 208, illustrated as neural network 208a, neural network 208b, and neural network 208c, each with the same structure and edge weights as the neural network 208. The anchor value 404 may be fed as input to the neural network 208a, which may output an anchor fingerprint based on the anchor value. Similarly, the positive example 406 may be fed as input to the neural network 208b, which may output a positive fingerprint based on the positive value, and the negative example 408 may be fed as input to the neural network 208c, which may output a negative fingerprint based on the negative example. In some embodiments, the triplet network may be implemented using the single neural network 208, which may be invoked three times, once for the anchor value, once of the positive example, and once for the negative example, to obtain the anchor fingerprint, positive fingerprint, and negative fingerprint, respectively.

The anchor fingerprint, positive fingerprint, and negative fingerprint may then be fed to the triplet loss function 412 to compute a triplet loss. The triplet loss may be computed based on the difference between the distance (e.g., the Euclidean distance) between the anchor fingerprint and the positive fingerprint and the distance between the anchor fingerprint and the negative fingerprint. For example, the triplet loss may be defined by the function $L=\max(d(a, p)-d(a, n)+\text{margin}, 0)$, where a is the anchor fingerprint, p is the positive fingerprint, n is the negative fingerprint, margin is a hyperparameter (e.g., the margin between the positive fingerprint and the negative fingerprint) added to the loss, and d is the Euclidean distance function. The triplet loss function may be used to minimize the distance between the anchor and positive fingerprints and maximize the distance between the anchor and negative fingerprints.

FIG. 5 illustrates a process 500 for generating device fingerprints according to an embodiment of the present disclosure. In some embodiments, the process 500 may be performed by a device fingerprint module 132. Note that one or more of the steps may be combined, omitted, or performed in a different order in different embodiments.

At step 505, the process 500 may obtain (e.g., using the sensor data processing module 204 of the device fingerprint module 132), from a sensor on a first device, a plurality of data points based on a first set of readings from the sensor. The sensor may be one of the sensors 118. The sensor data may include a plurality of data points based on a first set for readings from the first sensor, and each data point may be associated with a timestamp indicating when the reading was taken. For example, the sensor data processing module 204 may receive the sensor data from an API available to applications running on the device 110, or from a web browser through a similar API (e.g., the Generic Sensor API). Each data point may correspond to a sensor reading. In some embodiments, a data point may be a tuple including a number of elements. For example, a data point from an accelerometer may be a 3-tuple with values corresponding to acceleration along the x, y, and z axes, and a data point from a gyroscope may be 3-tuple with values corresponding to rotation rates along the x, and, z axes.

At step 510, the process 500 may extract (e.g., using the sensor data processing module 204) a set of time-domain features from the plurality of data points. The RSS of each data point may be computed to form a series of RSSs. For example, for a data point of the form (x, y, z), the RSS is computed as the square root of $x^2+y^2+z^2$. As the sensor readings may not have been collected at equally-spaced times, interpolation (e.g., using cubic spline interpolation) may be performed on the data points to obtain a resampled plurality of equally-spaced data points. The time domain features may then be extracted from the resampled plurality of data points. The time domain features may include, for example, a mean, standard deviation, variance, mode, kurtosis, skewness, mean absolute deviation, root-mean-square amplitude, maximum value, minimum value, value range, and/or energy.

At step 515, the process 500 may extract (e.g., using the sensor data processing module 204) a set of frequency-domain features from the plurality of data points. The sensor data processing module 204 may perform a discrete Fourier transform on the resampled plurality of data points to obtain a frequency-domain representation of the resampled plurality of data points and extract the frequency-domain features from the frequency-domain representation. The frequency-domain features may include, for example, spectral standard deviation, spectral variance, spectral centroid, spectral spread, spectral skewness, spectral kurtosis, spectral crest, irregularity-K, irregularity-J, flatness, and/or spectral entropy.

At step 520, the process 500 may input (e.g., using the sensor data processing module 204) the set of time-domain features and the set of frequency-domain features into a neural network 208. The sensor data processing module 204 may create a vector populated with each of the time-domain and frequency-domain features and feed the vector to an input layer of the neural network 208.

At step 525, the process 500 may obtain (e.g., using the sensor data processing module 204), from an output layer of the neural network 208, a first device fingerprint. The first device fingerprint may be, for example, a vector of latent features (also referred to as hidden features) determined by the neural network 208. The sensor data processing module 204 may store the first device fingerprint in the device fingerprint data store 210, along with a device ID corresponding to the device, and a pairing ID corresponding to a session (e.g., a web site visit) during which the sensor data on which the fingerprint is based was collected.

The neural network 208 may be trained (e.g., using the training module 212 of the device fingerprint module 132) via a triplet network 214. The triplet network 214 may be implemented using three instances (e.g., copies) of the neural network 208. The training module 212 may input an anchor value based on a second set of readings from the first device 110 into the first instance of the neural network 208, a positive example based on a third set of sensor readings from the first device 110 into the second instance of the neural network 208, and a negative example based on a set of sensor readings from a different device 110 than the anchor value and the positive example were obtained from. Each instance of the neural network 208 may generate a fingerprint based on the input fed to it, resulting in an anchor fingerprint from the first instance, a positive fingerprint from the second instance, and a negative fingerprint from the third instance.

A triplet loss may then be computed based on the difference between the distance (e.g., the Euclidean distance) between the anchor fingerprint and the positive fingerprint, and the distance between the anchor fingerprint and the negative fingerprint. For example, the triplet loss may be defined by the function $L=\max(d(a, p)-d(a, n)+\text{margin}, 0)$, where a is the anchor fingerprint, p is the positive fingerprint, n is the negative fingerprint, margin is a hyperparameter (e.g., the margin between the positive fingerprint and the negative fingerprint) added to the loss, and d is the Euclidean distance function. The triplet loss function may be used to minimize the distance between the anchor and positive fingerprints and maximize the distance between the anchor and negative fingerprints. In some embodiments, the triplet network may be implemented using only a single instance of the neural network 208. For example, the anchor value, positive example, and negative example may be fed to the neural network, one at a time, to obtain the anchor fingerprint, positive fingerprint, and negative fingerprint, respectively.

In some embodiments, a device fingerprint may be based on readings from more than one sensor (e.g., from an accelerometer and a gyroscope). For example, the sensor data processing module 204 may obtain a second plurality of data points based on readings from a second sensor on the first device 110. The sensor data processing module 204 may then perform the same operations as with the first plurality of data points, as described above, to extract a second set of time-domain features and a second set of frequency-domain features. The second set of time-domain features and the second set of frequency-domain features may then be fed as input to the neural network along with the sets of time-domain and frequency-domain features based on the readings from the first sensor. For example, the second set of time-domain features and the second set of frequency-domain features may be added to the vector of features that is inputted to the neural network.

In some embodiments, the process 500 may obtain (e.g., using the sensor data processing module 204) may fuse (e.g., combine) the device fingerprint based on sensor data with additional features. For example, the system may create a vector representing the additional features (e.g., user-agent string, screen size, operating system information, etc.) and concatenate it with the device fingerprint generated from the sensor data. The system may input the concatenated vector into an additional model (e.g., based on a neural network, weighted averaging, and/or Kalman filtering) to obtain a fused fingerprint.

In some embodiments, the process 500 (e.g., using the device identification module 206) may identify a device using the first device fingerprint. For example, the device identification module 206 may retrieve a plurality of sets of device fingerprints from the device fingerprint data store 210, where each set of device fingerprints is associated with a device ID. The device identification module 206 may then determine a best-matching set of device fingerprints based on comparisons between the first device fingerprint and each set of device fingerprints. For example, the device identification module 206 may compute the Euclidean distance between the first device fingerprint and fingerprints of the sets of fingerprints, and select the set where the average distance between fingerprints in the set and the first device fingerprint is the shortest. Alternately, the device identification module 206 may select the set of fingerprints containing the fingerprint with the shortest distance between it and the first device fingerprint. The device identification module 206 may then determine the device ID associated with the best-matching set of device fingerprints corresponds to the first device. The identification process may be made more efficient by limiting the number of sets of fingerprints from the device fingerprint data store 210 to be compared with the first device fingerprint. For example, each set of device fingerprints may be further associated with at least one additional feature (e.g., a user-agent string obtained from the device for which a set of fingerprints were generated), and the plurality of sets of device fingerprints may be retrieved from the device fingerprint data store 210 based on the at least one additional feature. For example, the device identification module 206 may retrieve only the sets of fingerprints associated with the user-agent string that matches one obtained from the device.

In some embodiments, the device identification module 206 may validate whether the first device fingerprint was generated from a specific device 110. For example, the device 110 may be associated with a device ID, and the device identification module 206 may retrieve one or more historical device fingerprints based on the device ID from the device fingerprint data store 210. The device identification module 206 may compare the first device fingerprint to the historical device fingerprints (e.g., based on Euclidean distance). If the minimum (or average) distance between the first device fingerprint and the historical fingerprints is below a threshold, the device identification module 206 may determine the first device fingerprint was generated from the same device as the historical fingerprints (indicating, for example, the device ID has not been spoofed). Otherwise, the device identification module 206 may determine the first device is a different device than the device from which the historical fingerprints were generated. In some embodiments, the comparison may also be based on a user-agent string. For example, the device fingerprint data store 210 may include a user-agent string with each set of historical fingerprints, and the first device 110 may be validated as being the device 110 from which the historical fingerprints were generated only if the minimum (or average) distance between the first device fingerprint and the historical fingerprints is below a threshold, and the user-agent string retrieved from the first device 110 matches the one associated with the historical device fingerprints. In some embodiments, a service provider server 130 may reject requests (e.g., login requests or transaction requests) from the first device 110 if it determines the first device fingerprint was not generated from the same device 110 as the historical device fingerprints.

The device identification module 206 may also validate the identity of the first device 110 by determining, in stages, whether information determined from the first device 110 matches information stored (e.g., based on the device ID) in the device fingerprint data store 210. For example, the device identification module 206 may first determine that a user-agent string obtained from the device 110 matches one associated with the device ID in the device fingerprint data store 210. If so, the device identification module 206 may compare screen-size information determined from the device 110 to determine if it matches screen-size information stored in the device fingerprint data store 210, and then compare the device fingerprint obtained from the device 110 to device fingerprints stored in the data store 210. If all or some of the information matches, the device 110 may be determined to be the one identified by the device ID in the data store 210. In some embodiments, the comparisons may be done in parallel rather than sequentially.

Figure 6:
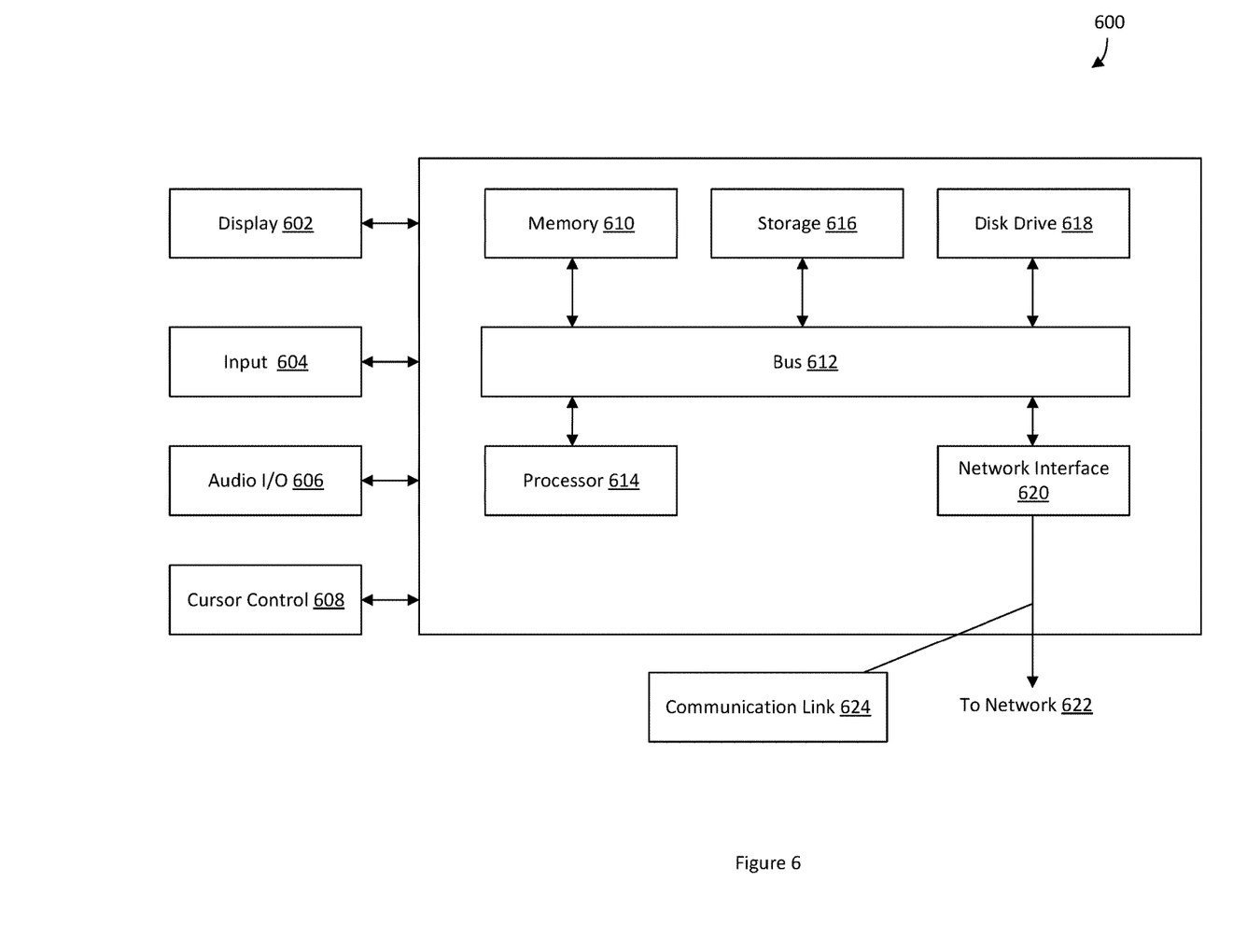
FIG. 6 is a block diagram of a system for implementing a device according to an embodiment of the present disclosure.

FIG. 6 is a block diagram of a computer system 600 suitable for implementing one or more embodiments of the present disclosure, including the service provider server 130 and the user device 110. In various implementations, the user device 110 may include a mobile cellular phone, personal computer (PC), laptop, wearable computing device, etc. adapted for wireless communication, and the service provider server 130 may include a network computing device, such as a server. Thus, it should be appreciated that the devices 110 and 130 may be implemented as the computer system 600 in a manner as follows.

The computer system 600 includes a bus 612 or other communication mechanism for communicating information data, signals, and information between various components of the computer system 600. The components include an input/output (I/O) component 604 that processes a user (i.e., sender, recipient, service provider) action, such as selecting keys from a keypad/keyboard, selecting one or more buttons or links, etc., and sends a corresponding signal to the bus 612. The I/O component 604 may also include an output component, such as a display 602 and a cursor control 608 (such as a keyboard, keypad, mouse, etc.). The display 602 may be configured to present a login page for logging into a user account or checkout page for purchasing an item from a merchant. An optional audio input/output component 606 may also be included to allow a user to use voice for inputting information by converting audio signals. The audio I/O component 606 may allow the user to hear audio. A transceiver or network interface 620 transmits and receives signals between the computer system 600 and other devices, such as another user device, a merchant server, or a service provider server via network 622. For example, the network interface 620 may transmit or receive requests from the user for products or services offered by the service provider. In one embodiment, the transmission is wireless, although other transmission mediums and methods may also be suitable. A processor 614, which can be a micro-controller, digital signal processor (DSP), or other processing component, processes these various signals, such as for display on the computer system 600 or transmission to other devices via a communication link 624. The processor 614 may also control transmission of information, such as cookies or IP addresses, to other devices.

The components of the computer system 600 also include a system memory component 610 (e.g., RAM), a static storage component 616 (e.g., ROM), and/or a disk drive 618 (e.g., a solid-state drive, a hard drive). The computer system 600 performs specific operations by the processor 614 and other components by executing one or more sequences of instructions contained in the system memory component 610. For example, the processor 614 can perform the device fingerprinting functions described herein according to processes 300 and 500.

Logic may be encoded in a computer readable medium, which may refer to any medium that participates in providing instructions to the processor 614 for execution. Such a medium may take many forms, including but not limited to, non-volatile media, volatile media, and transmission media. In various implementations, non-volatile media includes optical or magnetic disks, volatile media includes dynamic memory, such as the system memory component 610, and transmission media includes coaxial cables, copper wire, and fiber optics, including wires that comprise the bus 612. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 600. In various other embodiments of the present disclosure, a plurality of computer systems 600 coupled by the communication link 624 to the network (e.g., such as a LAN, WLAN, PTSN, and/or various other wired or wireless networks, including telecommunications, mobile, and cellular phone networks) may perform instruction sequences to practice the present disclosure in coordination with one another.

Figure 7:
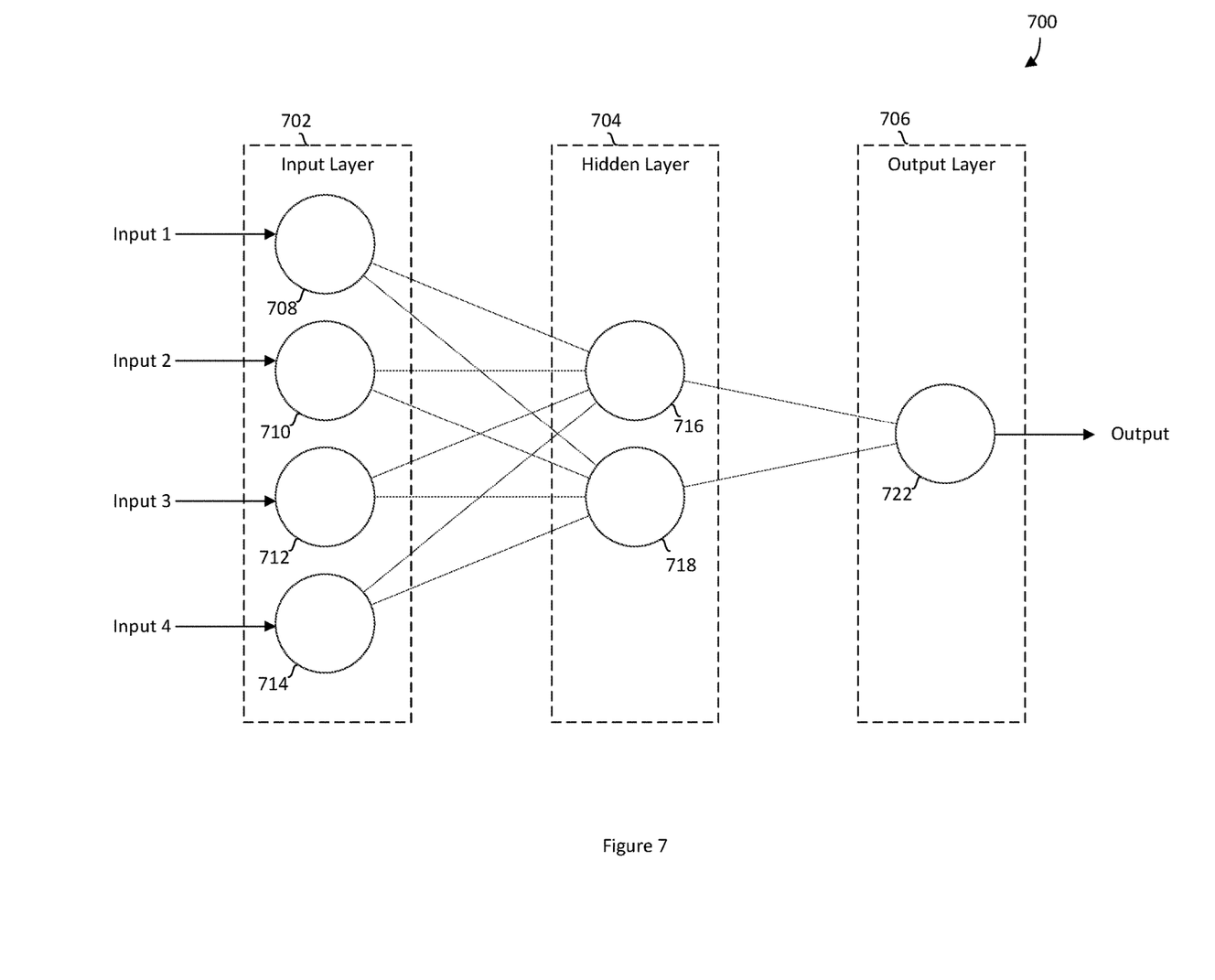
FIG. 7 is a block diagram of a neural network for implementing systems and methods described herein, according to an embodiment of the present disclosure.

FIG. 7 is a block diagram of a neutral network 700 that can be used to implement neural network 208 according to one embodiment. As shown, the artificial neural network 700 includes three layers—an input layer 702, a hidden layer 704, and an output layer 706. Each of the layers 702, 704, and 706 may include one or more nodes. For example, the input layer 702 includes nodes 708-714, the hidden layer 704 includes nodes 716-718, and the output layer 706 includes a node 722. In this example, each node in a layer is connected to every node in an adjacent layer. For example, the node 708 in the input layer 702 is connected to both of the nodes 716-718 in the hidden layer 704. Similarly, the node 716 in the hidden layer is connected to all of the nodes 708-714 in the input layer 702 and the node 722 in the output layer 706. Although only one hidden layer is shown for the artificial neural network 700, it has been contemplated that the artificial neural network 700 may include many hidden layers (e.g., 50, 80, etc.).

In this example, the artificial neural network 700 receives a set of input values and produces an output value. Each node in the input layer 702 may correspond to a distinct input value. For example, when the artificial neural network 700 is used to implement the neural network 208, each node in the input layer 702 may correspond to a time-domain or frequency feature (e.g., each element of a vector of features may be fed to a node of the input layer 702). Even though only four nodes are shown in the input layer 702, any number of nodes can be included in the artificial neural network 700. For example, the input layer 702 may include as many nodes as the number of time-domain and frequency-domain features extracted from sensor data, such that each node in the input layer 702 may correspond to a time-domain or frequency-domain feature. For the 23 time-domain and frequency-domain features discussed with respect to FIG. 5, the input layer 702 may include 23 nodes, each corresponding to a feature. In a non-limiting example, the nodes 708, 710, 712, and 714 may correspond to the mean, standard deviation, variance, and mode, respectively, and so forth.

In some embodiments, each of the nodes 716-718 in the hidden layer 704 generates a representation, which may include a mathematical computation (or algorithm) that produces a value based on the input values received from the nodes 708-714. The mathematical computation may include assigning different weights to each of the data values received from the nodes 708-714. The nodes 716 and 718 may include different algorithms and/or different weights assigned to the data variables from the nodes 708-714 such that the nodes 716-718 may produce different values based on the same input values received from the nodes 708-714. In some embodiments, the weights that are initially assigned to the features (or input values) for each of the nodes 716-718 may be randomly generated (e.g., using a computer randomizer). The values generated by the nodes 716 and 718 may be used by the node 722 in the output layer 706 to produce an output value for the artificial neural network 700. When the artificial neural network 700 is used to implement the neural network 208, the output produced by the artificial neural network 700 may include a device fingerprint. The artificial neural network 700 may be trained via a triplet network as described with respect to FIG. 4 using training data (e.g., triplets including an anchor value, positive example, and negative example).

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
a non-transitory memory; and
one or more hardware processors coupled with the non-transitory memory and configured to read instructions from the non-transitory memory to cause the system to perform operations comprising:
obtaining, from a sensor on a first device, a plurality of data points based on a first set of readings from the sensor, wherein each data point of the plurality of data points is a tuple including a number of elements;
extracting a set of time-domain features from the plurality of data points, wherein the extracting comprises:
determining a series of root sum squares, wherein each item in the series corresponds to a root sum square of the elements of the tuple for each data point of the plurality of data points, and
obtaining a resampled plurality of data points by performing a cubic spline interpolation on the series of root sum squares, wherein the set of time-domain features are extracted from the resampled plurality of data points;
extracting a set of frequency-domain features from the plurality of data points;
inputting feature data for the set of time-domain features and the set of frequency-domain features into an input layer for neural network features of a neural network;
processing the feature data from the input layer using a plurality of hidden layers of the neural network;
computing a vector for the neural network features from the set of time-domain features and the set of frequency-domain features using one of the plurality of hidden layers, wherein the vector provides an increased security for the first device during device fingerprinting; and
obtaining, from an output layer of the neural network, a first device fingerprint, wherein the first device fingerprint comprises the vector as a representation of the neural network features for the feature data.

2. The system of claim 1, wherein the inputting of the set of time-domain features and the set of frequency-domain features into the neural network comprises:
populating a feature vector with each time-domain feature of the set of time-domain features and each frequency-domain feature of the set of frequency-domain features; and
inputting the feature vector into the neural network.

3. The system of claim 1, wherein the extracting of the set of frequency-domain features comprises:
obtaining a frequency-domain representation of the resampled plurality of data points by performing a discrete Fourier transform on the resampled plurality of data points, wherein the set of frequency-domain features are extracted from the frequency-domain representation of the resampled plurality of data points.

4. The system of claim 1, the operations further comprising training the neural network, wherein the training includes:
inputting an anchor value into a first instance of the neural network in a triplet network, wherein the anchor value is based on a second set of sensor readings from the first device;
obtaining an anchor fingerprint from the first instance of the neural network in the triplet network based on the anchor value;
inputting a positive example into a second instance of the neural network in the triplet network, wherein the positive example is based on a third set of sensor readings from the first device;
obtaining a positive fingerprint from the second instance of the neural network in the triplet network based on the positive example;
inputting a negative example into a third instance of the neural network in the triplet network, wherein the negative example is based on sensor readings from a second device different from the first device;
obtaining a negative fingerprint from the third instance of the neural network in the triplet network based on the negative example; and
computing a triplet loss based at least on a difference between a distance between the anchor fingerprint and the positive fingerprint and a distance between the anchor fingerprint and the negative fingerprint.

5. The system of claim 1, the operations further comprising:
retrieving, from a data store, a plurality of sets of device fingerprints, each set of device fingerprints being associated with a device ID;
determining a best-matching set of device fingerprints based on comparisons between the first device fingerprint and the each set of device fingerprints; and
determining the device ID associated with the best-matching set of device fingerprints corresponds to the first device based at least on the device ID being associated with the best-matching set of device fingerprints.

6. The system of claim 5, wherein the each set of device fingerprints is further associated with at least one additional feature, and the plurality of sets of device fingerprints are retrieved from the data store based on the at least one additional feature.

7. The system of claim 6, wherein the at least one additional feature includes a user-agent string.

8. The system of claim 1, the operations further comprising:
retrieving from a data store based on a device ID associated with the first device, one or more historical device fingerprints associated with the device ID; and
determining the first device is different from a second device from which the one or more historical device fingerprints were generated, based at least on a comparison between the first device fingerprint and the historical device fingerprints.

9. The system of claim 8, wherein the determining the first device is different from the second device is further based on a user-agent string associated with the first device being different from a user-agent string associated with the one or more historical device fingerprints.

10. The system of claim 1, wherein the sensor is one of an accelerometer, a gyroscope, or a magnetometer.

11. The system of claim 1, wherein the first device fingerprint is a value identifying the first device based on the first set of readings from the sensor.

12. The system of claim 1, wherein the time-domain features include at least one of a kurtosis, a skewness, or a mean absolute deviation.

13. The system of claim 1, wherein the frequency-domain features include at least one of a spectral kurtosis, a spectral crest, or a spectral entropy.

14. The system of claim 1, wherein the cubic spline interpolation on the series of root sum squares is performed to obtain equally-spaced times for each data point of the plurality of data points.

15. A method, comprising:
receiving, at a web server, a request from a first device associated with a first device ID;
obtaining, from a first sensor on the first device, a first plurality of data points based on readings from the first sensor;
inputting feature data for the first plurality of data points into an input layer for neural network features of a neural network;
processing the feature data from the input layer using a plurality of hidden layers of the neural network;
computing a vector for the neural network features from the first plurality of data points using one of the plurality of hidden layers, wherein the vector provides an increased security for the first device during device fingerprinting;
obtaining, from a neural network, a first device fingerprint based on the first plurality of data points, wherein the first device fingerprint comprises the vector as a representation of the neural network features for the feature data;
retrieving, from a data store, a second device fingerprint associated with the first device ID;
determining a distance between the first device fingerprint and the second device fingerprint;
retrieving, from a data store, a plurality of sets of device fingerprints, each set of device fingerprints being associated with a device ID;
determining a best-matching set of device fingerprints based on comparisons between the first device fingerprint and the each set of device fingerprints; and
determining the device ID associated with the best-matching set of device fingerprints corresponds to the first device based at least on the device ID being associated with the best-matching set of device fingerprints.

16. The method of claim 15, wherein obtaining the first device fingerprint comprises:
extracting a first set of time-domain features from the first plurality of data points;
extracting a first set of frequency-domain features from the first plurality of data points;
inputting the first set of time-domain features and the first set of frequency-domain features into the neural network; and
obtaining, from an output layer of the neural network, the first device fingerprint.

17. The method of claim 15, further comprising:
determining the distance between the first device fingerprint and the second device fingerprint is at or above a threshold; and
rejecting, in response to the determining the distance at or above the threshold, the request.

18. A non-transitory machine-readable medium having stored thereon machine-readable instructions executable to cause a machine to perform operations comprising:
obtaining, from a first sensor on a first device, a first plurality of data points based on readings from the first sensor;
obtaining, from a second sensor on a first device, a second plurality of data points based on readings from the second sensor;
extracting a first set of time-domain features from the first plurality of data points and a second set of time-domain features from the second plurality of data points;
extracting a first set of frequency-domain features from the first plurality of data points and a second set of frequency-domain features from the second plurality of data points, wherein the extracting of the first and second sets of frequency-domain features comprises:
obtaining a frequency-domain representation of a resampled plurality of data points by performing a discrete Fourier transform on the resampled plurality of data points, wherein the resampled plurality of data points are associated with elements for the first and second set of time-domain features, and wherein the first and second set of frequency-domain features are extracted from the frequency-domain representation of the resampled plurality of data points;
inputting feature data for the first set of time-domain features and the second set of time-domain features and the first set of frequency-domain features and second set of frequency-domain features into an input layer for neural network features of a neural network;
processing the feature data from the input layer using a plurality of hidden layers of the neural network;
computing a vector for the neural network features from the set of time-domain features and the set of frequency-domain features using one of the plurality of hidden layers, wherein the vector provides an increased security for the first device during device fingerprinting; and
obtaining, from an output layer of the neural network, a first device fingerprint wherein the first device fingerprint comprises the vector as a representation of the neural network features for the feature data.

19. The non-transitory machine-readable medium of claim 18, wherein inputting the first set of time-domain features and the second set of time-domain features and the first set of frequency-domain features and second set of frequency-domain features into a neural network comprises:
populating a feature vector with each time-domain feature of the first and second set of time-domain features and each frequency-domain feature of the first and second set of frequency-domain features; and
inputting the feature vector into the neural network.

20. The non-transitory machine-readable medium of claim 18, wherein the first sensor is an accelerometer and the second sensor is a gyroscope.

* * * * *